(12) United States Patent
Yamamoto (10) Patent No.: US 6,894,848 B2
(45) Date of Patent: May 17, 2005

(54) IMAGE SCANNING LENS AND IMAGE SCANNING DEVICE THAT USES SAME

(75) Inventor: Yoko Yamamoto, Fuchu (JP)

(73) Assignee: Fujinon Corporation, Saitama (JP)

( * ) Notice: Subject to any disclaimer, the term of this patent is extended or adjusted under 35 U.S.C. 154(b) by 12 days.

(21) Appl. No.: 10/805,197

(22) Filed: Mar. 22, 2004

(65) Prior Publication Data
US 2004/0190161 A1 Sep. 30, 2004

(30) Foreign Application Priority Data
Mar. 27, 2003 (JP) ........................................ 2003-089375

(51) Int. Cl.$^7$ ................................................. G02B 9/34
(52) U.S. Cl. ...................................... 359/772; 359/771
(58) Field of Search ............................... 359/771–775, 359/362, 363, 366, 365, 779, 780, 809, 806

(56) References Cited

U.S. PATENT DOCUMENTS 5,589,989 A * 12/1996 Estelle et al. ............... 359/785

FOREIGN PATENT DOCUMENTS

| JP | H11-190820 | 7/1999 |
|----|------------|--------|
| JP | 2000-249913 | 9/2000 |
| JP | 2002-31753 | 1/2002 |

* cited by examiner

*Primary Examiner*—Hung Xuan Dang
*Assistant Examiner*—Joseph Martinez
(74) *Attorney, Agent, or Firm*—Arnold International; Jon W. Henry; Bruce Y. Arnold (57) ABSTRACT

An image scanning lens includes four lens components, each of which may be a lens element. From the object side of the image scanning lens, the first lens component has positive refractive power and a meniscus shape with the convex surface on the object side, the second lens component has a biconcave shape, the third lens component has a biconvex shape, and the fourth lens component has negative refractive power and a concave surface on the object side and may be a meniscus lens or a biconcave lens component. The image scanning lens satisfies certain conditions related to the focal lengths of the first, second, and fourth lens components of the image scanning lens and to the relative partial dispersions of the lens elements. An image scanning device, such as an image scanner, with an image pickup device, such as a CCD, uses the image scanning lens.

20 Claims, 6 Drawing Sheets

IMAGE SCANNING LENS AND IMAGE SCANNING DEVICE THAT USES SAME

BACKGROUND OF THE INVENTION

Various types of image scanning lenses used in image scanning devices, such as facsimile machines and image scanners, are known. For example, Japanese Laid-Open Patent Application H11-190820, Japanese Laid-Open Patent Application 2000-249913, and Japanese Laid-Open Patent Application 2002-31753 disclose such image scanning lenses. The image scanning lenses described in these three Japanese applications include four lens components, with each lens component being a lens element, and the described image scanning lenses are designed to have high resolution corresponding to the high density of image detecting elements used in the CCD's that are used as image pickup elements in the image scanning devices.

However, today high optical performance related to scanning color images is demanded. The image scanning lenses of the Japanese applications discussed above have problems of chromatic aberrations that result in these lenses not always providing satisfactory performance for high precision color images.

BRIEF SUMMARY OF THE INVENTION

The present invention relates to an image scanning lens, and an image scanning device, such as a facsimile device or an image scanner, that uses it. The image scanning lens includes four lens components, each of which may be a lens element, that enables production of a high precision color image of an original color document with excellent correction of chromatic aberration in the color image.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION OF THE INVENTION

Figure 1:
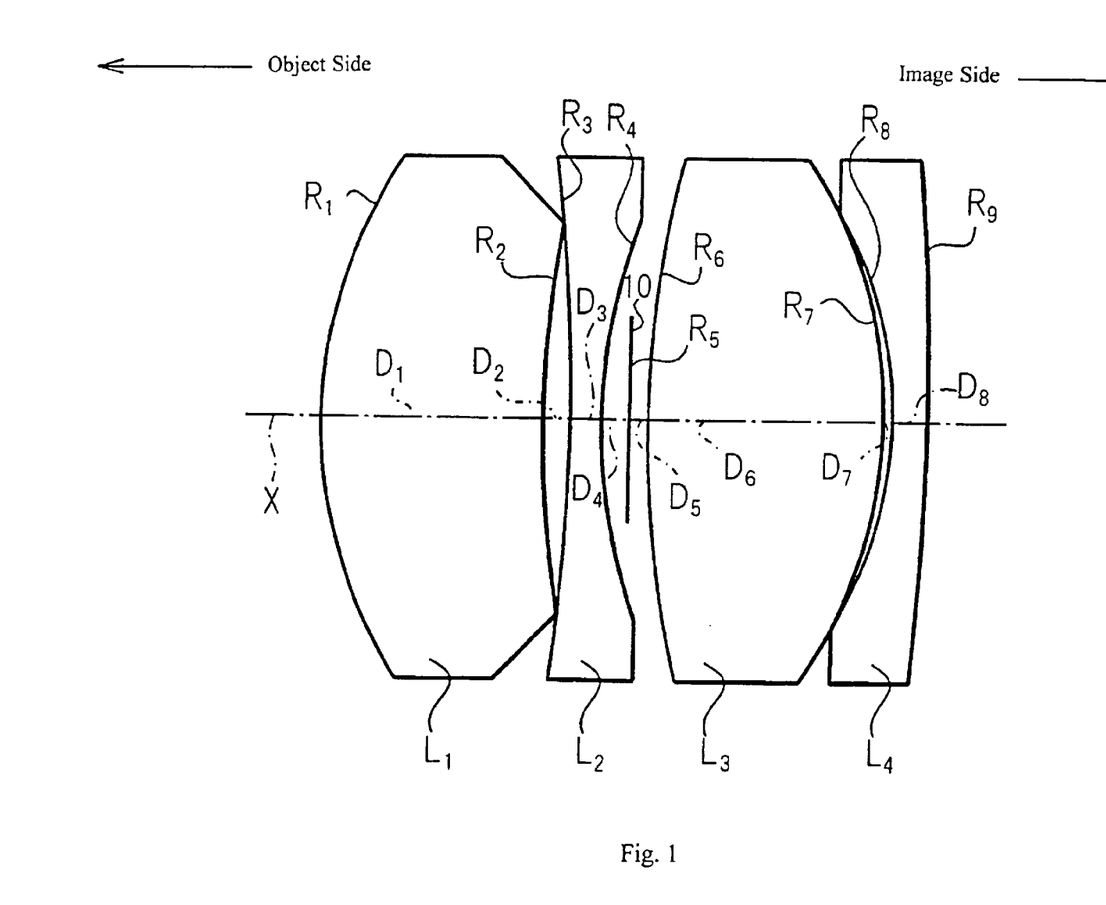
FIG. 1 shows a cross-sectional view of Embodiment 1 of the image scanning lens of the present invention.

A general description of the image scanning lens of the present invention that pertains to all four embodiments of the invention will first be described with reference to FIG. 1 that shows Embodiment 1. In FIG. 1, lens elements are referenced by the letter L with a subscript number denoting their order from the object side of the image scanning lens along the optical axis X, from $L_1$ to $L_4$. Similarly, radii of curvature of the surfaces of the lens elements and a diaphragm stop 10 that acts as an aperture stop are referenced by the letter R with a subscript number denoting their order from the object side of the image scanning lens, from $R_1$ to $R_9$. The on-axis surface spacings along the optical axis X of the various optical surfaces are referenced by the letter D with a subscript number denoting their order from the object side of the image scanning lens, from $D_1$ to $D_8$.

A horizontal arrow at the upper left of FIG. 1 that points left indicates the object direction, and a horizontal arrow at the upper right of FIG. 1 that points right indicates the image direction. The image scanning lens is designed so that a luminous flux of light travels from the object side of the image scanning lens to the image side of the image scanning lens in order to form an image on an image plane (not shown) where a CCD element may be located.

Definitions of the terms "lens element" and "lens component" that relate to this detailed description will now be given. The term "lens element" is herein defined as a single transparent mass of refractive material having two opposed refracting surfaces, which surfaces are positioned at least generally transversely of the optical axis of the image scanning lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." Thus, the present invention may variously be described in terms of lens elements or in terms of lens components.

As shown in FIG. 1, the image scanning lens may include, in order from the object side: a first lens element $L_1$ having positive refractive power and a meniscus shape with its concave surface on the image side, a second lens element $L_2$ that is biconcave with surfaces of different curvature and with the surface of greater curvature on the image side, a third lens element $L_3$ that is biconvex, and the fourth lens element $L_4$ having negative refractive power with surfaces of different curvature and with the surface of greater absolute value of curvature being concave and on the object side. In Embodiments 1–3 described below, the fourth lens element $L_4$ is a meniscus lens element, and in Embodiment 4 described below, the fourth lens element $L_4$ is a biconcave lens element. Making the fourth lens element $L_4$ a biconcave lens element enables particularly favorable correction of curvature of field and coma aberrations.

Additionally, in the image scanning lens of the present invention, the following Condition (1) is satisfied for the first lens element $L_1$ and the following Condition (2) is satisfied for the second lens element $L_2$ or for the fourth lens element $L_4$:

$$\theta_{gd} > -2.083 \cdot 10^{-3} \cdot v_d + 1.366 \qquad \text{Condition (1)}$$

$$\theta_{gd} < -2.083 \cdot 10^{-3} \cdot v_d + 1.364 \qquad \text{Condition (2)}$$

where $\theta_{gd}$ is the relative partial dispersion of the lens material of the lens element being considered, $v_d$ is the Abbe number at the d-line (587.56 nm) of the lens material of the lens element being considered.

In particular, $\theta_{gd}$ is defined as follows:

$$\theta_{gd}=(N_g-N_d)/(N_F-N_C)$$

where $N_g$ is the refractive index at the g-line ($\lambda$=435.83 nm) of the lens material of the lens element being considered, $N_d$ is the refractive index at the d-line ($\lambda$=587.56 nm) of the lens material of the lens element being considered, $N_F$ is the refractive index at the F-line ($\lambda$=486.13 nm) of the lens material of the lens element being considered, and $N_C$ is the refractive index at the C-line ($\lambda$=656.27 nm) of the lens material of the lens element being considered.

As mentioned above, Condition (1) is applied to select an appropriate optical material for the first lens element $L_1$, and Condition (2) is applied to select an appropriate optical material for the second lens element $L_2$ or the fourth lens element $L_4$.

If Condition (1) above is not satisfied for the first lens element $L_1$, axial chromatic aberration cannot be favorably corrected. If Condition (2) above is satisfied for neither the second lens element $L_2$ nor the fourth lens element $L_4$, lateral color cannot be favorably corrected. Additionally, when the fourth lens element $L_4$ is a biconcave lens element, as in Embodiment 4 described below, Condition (2) applies particularly to the material of the second lens element $L_2$.

Also, preferably the image scanning lens satisfies the following Conditions (3)–(5):

| | |
|---|---|
| $0.45 < f1/f < 0.98$ | Condition (3) |
| $0.34 < \|f2\|/f < 0.40$ | Condition (4) |
| $0.31 < \|f4\|/f < 0.56$ | Condition (5) | where f1 is the focal length of the first lens element $L_1$, f2 is the focal length of the second lens element $L_2$, f4 is the focal length of the fourth lens element $L_4$, and f is the focal length of the image scanning lens.

Additionally, when the fourth lens element $L_4$ is a meniscus lens element, as in Embodiments 1–3 described below, it is even more preferable that the following Conditions (3')–(5') that further restrict Conditions (3)–(5), respectively, be satisfied:

| | |
|---|---|
| $0.66 < f1/f < 0.98$ | Condition (3') |
| $0.34 < \|f2\|/f < 0.38$ | Condition (4') |
| $0.45 < \|f4\|/f < 0.56$ | Condition (5') |

Alternatively, when the fourth lens element $L_4$ is a biconcave lens element, as in Embodiment 4 described below, it is even more preferable that the following Conditions (6)–(8) that further restrict Conditions (3)–(5), respectively, be satisfied:

| | |
|---|---|
| $0.45 < f1/f < 0.66$ | Condition (6) |
| $0.36 < \|f2\|/f < 0.40$ | Condition (7) |
| $0.31 < \|f4\|/f < 0.52$ | Condition (8) |

If the ratio of Condition (3) is larger than the upper limit of Condition (3), axial chromatic aberration cannot be favorably corrected. On the other hand, if the ratio of Condition (3) is smaller than the lower limit of Condition (3), lateral color cannot be favorably corrected. Additionally, especially when the fourth lens element $L_4$ is a biconcave lens element, axial chromatic aberration and lateral color can be favorably corrected by satisfying Condition (6).

If the ratio of Condition (4) is larger than the upper limit of Condition (4), lateral color cannot be favorably corrected. On the other hand, if the ratio of Condition (4) is smaller than the lower limit of Condition (4), coma aberration cannot be favorably corrected. Additionally, especially when the fourth lens element $L_4$ is a biconcave lens element, coma aberration and lateral color can be favorably corrected by satisfying Condition (7).

If the ratio of Condition (5) is larger than the upper limit of Condition (5), curvature of field cannot be favorably corrected. On the other hand, if the ratio of Condition (5) is smaller than the lower limit of Condition (5), spherical aberration cannot be favorably corrected. Additionally, especially when the fourth lens element $L_4$ is a biconcave lens element, curvature of field and spherical aberration can be favorably corrected by satisfying Condition (8).

Embodiments 1–4 of the present inventions will now be individually described with further reference to the drawings. In the following descriptions, references will be frequently made to a "lens element." However, as set forth above, it is understood that lens elements described below are also lens components and may be replaced by lens components that include more than one lens element.

Embodiment 1

FIG. 1 shows the basic lens element configuration of the image scanning lens of Embodiment 1.

Table 1 below lists the surface number # in order from the object side, the radius of curvature R (in mm) of each surface, the on-axis surface spacing D (in mm), the refractive index $N_d$ (at the d-line), the refractive index $N_g$ (at the g-line), the refractive index $N_F$ (at the F-line), the refractive index $N_C$ (at the C-line), the Abbe number $v_d$ (at the d-line), and the product name that the manufacturer (O'Hara) uses to identify the optical material used to make each lens element for Embodiment 1. Listed in the middle portion of Table 1 are the focal length f, the f-number $F_{NO}$, the magnification $\beta$, and the maximum field angle $2\omega$ for Embodiment 1. Furthermore, listed in the bottom portion of Table 1 are the values corresponding to Conditions (1)–(8) for Embodiment 1.

TABLE 1

| # | R | D | $N_d$ | $N_g$ | $N_F$ | $N_C$ | $v_d$ | Optical Material |
|---|---|---|---|---|---|---|---|---|
| 1 | 29.01 | 14.38 | 1.61800 | 1.63010 | 1.62479 | 1.61504 | 63.4 | S-PHM52 |
| 2 | 67.94 | 1.77 | | | | | | |

TABLE 1-continued

| # | R | D | $N_d$ | $N_g$ | $N_F$ | $N_C$ | $v_d$ | Optical Material |
|---|---|---|---|---|---|---|---|---|
| 3 | −119.11 | 2.03 | 1.72047 | 1.74723 | 1.73512 | 1.71437 | 34.7 | S-NBH8 |
| 4 | 34.21 | 1.86 | | | | | | |
| 5 | ∞(stop) | 1.27 | | | | | | |
| 6 | 64.73 | 15.20 | 1.81600 | 1.83800 | 1.82825 | 1.81075 | 46.6 | S-LAH59 |
| 7 | −28.56 | 0.60 | | | | | | |
| 8 | −24.57 | 2.28 | 1.56732 | 1.58423 | 1.57664 | 1.56339 | 42.8 | S-TIL26 |
| 9 | −169.08 | | | | | | | | f = 100 mm   $F_{NO}$ = 6.0   β = −0.189   2ω = 46.1°
Condition (1) value: $θ_{gd}$ = 1.24103 ($v_d$ = 63.4)
Condition (2) value: $θ_{gd}$ = 1.28964 ($v_d$ = 34.7)
Condition (3), (3'), (6) value: f1/f = 0.718
Condition (4), (4'), (7) value: | f2 |/f = 0.367
Condition (5), (5'), (8) value: | f4 |/f = 0.510

In Table 1 above, Condition (2) relates to the second lens element $L_2$. Embodiment 1 satisfies Conditions (1)–(5).

Figure 2A:
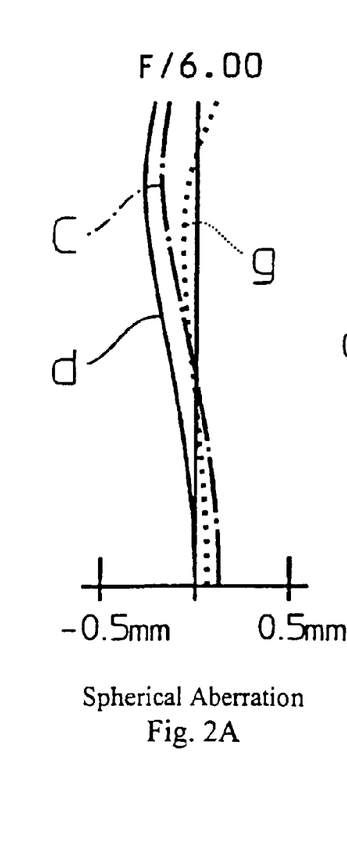
FIGS. 2A–2D show the spherical aberration, astigmatism, distortion, and lateral color, respectively, of the image scanning lens according to Embodiment 1.
Figure 2B:
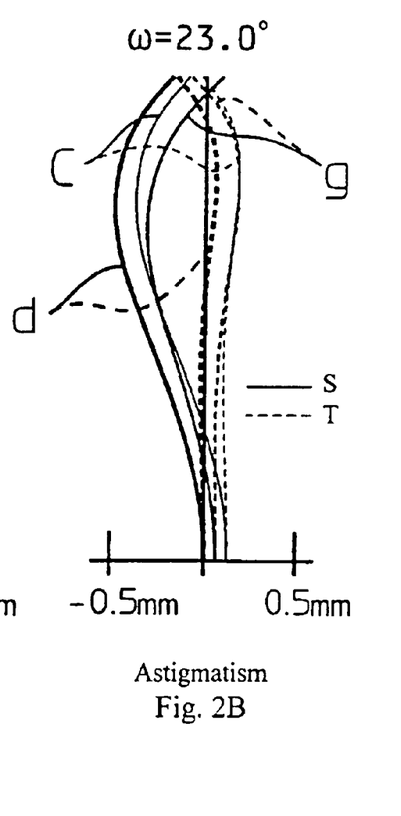
Figure 2C:
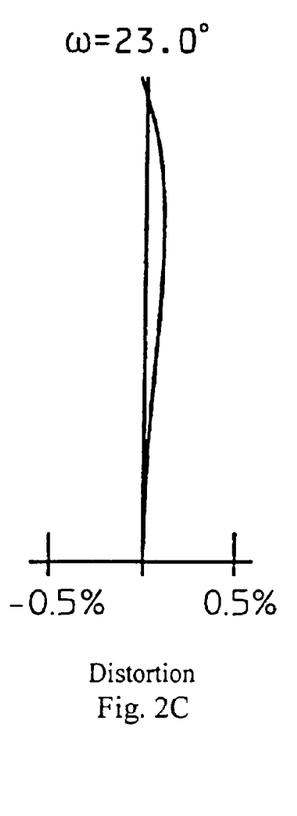
Figure 2D:
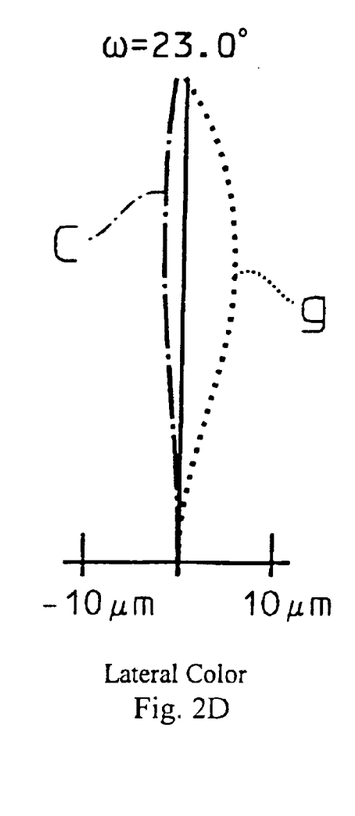

FIGS. 2A–2D show the spherical aberration, astigmatism, distortion, and lateral color, respectively, of the image scanning lens of Embodiment 1. These aberration diagrams are based on the focal length being 100 mm and a plane parallel glass plate with a thickness of 7.10 mm being arranged in the optical path on the object side of the image scanning lens as well as a plane parallel plate with a thickness of 1.77 mm being arranged in the optical path on the image side of the image scanning lens. As shown in FIG. 2A, the spherical aberration is shown at an f-number, $F_{NO}$, of 6.00. In FIGS. 2A and 2B, aberrations are shown for the d-line, the g-line, and the C-line. In FIG. 2B, the astigmatism is shown for the sagittal image surface S and for the tangential image surface T for each wavelength. In FIG. 2C, distortion is shown for the d-line. In FIG. 2D, lateral color is shown for both the C-line and the g-line relative to the d-line. The half-field angle ω for FIGS. 2B–2D is 23.0°. As is apparent from these figures, the various aberrations are favorably corrected.

Embodiment 2

Embodiment 2 is very similar to Embodiment 1 and uses the same number of lens elements. Because Embodiment 2 is very similar to Embodiment 1, the differences between Embodiment 2 and Embodiment 1 will be evident from Table 2 that follows.

Table 2 below lists the surface number # in order from the object side, the radius of curvature R (in mm) of each surface, the on-axis surface spacing D (in mm), the refractive index $N_d$ (at the d-line), the refractive index $N_g$ (at the g-line), the refractive index $N_F$ (at the F-line), the refractive index $N_C$ (at the C-line), the Abbe number $v_d$ (at the d-line), and the product name that the manufacturer (O'Hara) uses to identify the optical material used to make each lens element for Embodiment 2. Listed in the middle portion of Table 2 are the focal length f, the f-number $F_{NO}$, the magnification β, and the maximum field angle 2ω for Embodiment 2. Furthermore, listed in the bottom portion of Table 2 are the values corresponding to Conditions (1)–(8) for Embodiment 2.

TABLE 2

| # | R | D | $N_d$ | $N_g$ | $N_F$ | $N_C$ | $v_d$ | Optical Material |
|---|---|---|---|---|---|---|---|---|
| 1 | 28.80 | 13.07 | 1.60300 | 1.61438 | 1.60940 | 1.60019 | 65.5 | S-PHM53 |
| 2 | 54.01 | 1.78 | | | | | | |
| 3 | −97.70 | 4.82 | 1.63980 | 1.66393 | 1.65294 | 1.63438 | 34.5 | S-TIM27 |
| 4 | 31.92 | 1.90 | | | | | | |
| 5 | ∞(stop) | 0.00 | | | | | | |
| 6 | 50.27 | 15.23 | 1.81600 | 1.83800 | 1.82825 | 1.81075 | 46.6 | S-LAH59 |
| 7 | −29.72 | 0.76 | | | | | | |
| 8 | −25.75 | 2.28 | 1.61340 | 1.63091 | 1.62311 | 1.60925 | 44.3 | S-NBM51 |
| 9 | −149.92 | | | | | | | | f = 100 mm   $F_{NO}$ = 6.0   β = −0.189   2ω = 46.0°
Condition (1) value: $θ_{gd}$ = 1.23561 ($v_d$ = 65.5)
Condition (2) value: $θ_{gd}$ = 1.26335 ($v_d$ = 44.3)
Condition (3), (3'), (6) value: f1/f = 0.856
Condition (4), (4'), (7) value: | f2 |/f = 0.371
Condition (5), (5'), (8) value: | f4 |/f = 0.510

In Table 2 above, Condition (2) relates to the fourth lens element $L_4$. Embodiment 2 satisfies Conditions (1)–(5).

Figure 3A:
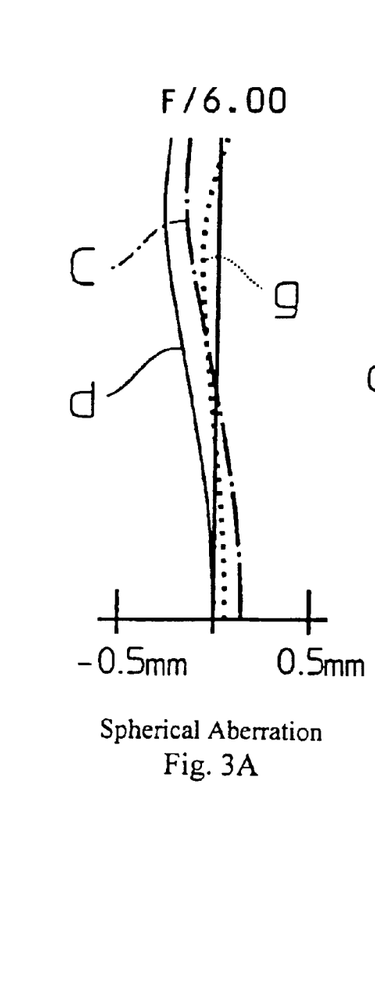
FIGS. 3A–3D show the spherical aberration, astigmatism, distortion, and lateral color, respectively, of the image scanning lens according to Embodiment 2.
Figure 3B:
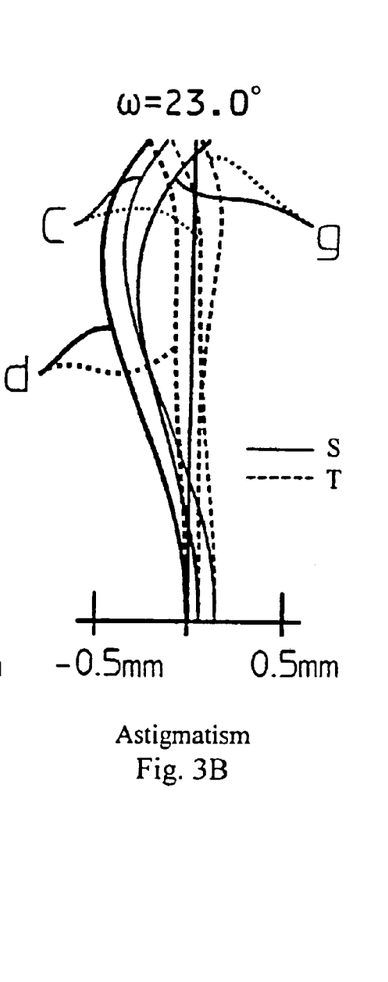
Figure 3C:
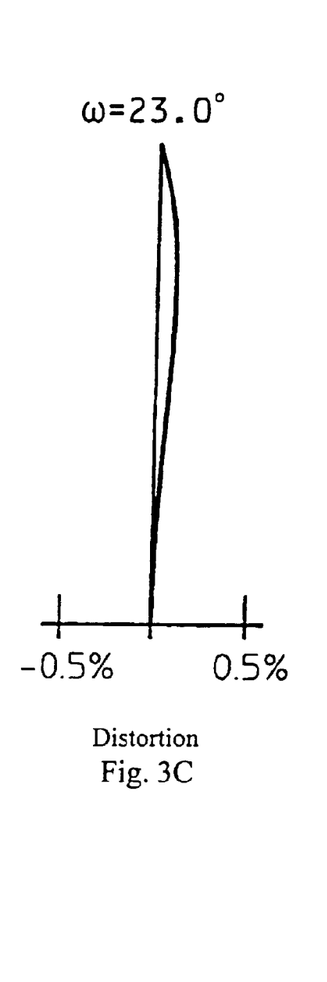
Figure 3D:
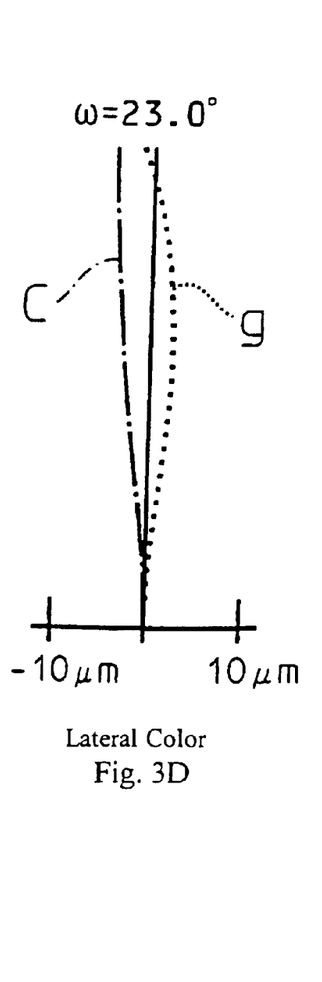

FIGS. 3A–3D show the spherical aberration, astigmatism, distortion, and lateral color, respectively, of the image scanning lens of Embodiment 2. These aberration diagrams are based on the focal length being 100 mm and a plane parallel glass plate with a thickness of 7.10 mm being arranged in the optical path on the object side of the image scanning lens as well as a plane parallel plate with a thickness of 1.77 mm being arranged in the optical path on the image side of the image scanning lens. As shown in FIG. 3A, the spherical aberration is shown at an f-number, $F_{NO}$, of 6.00. In FIGS. 3A and 3B, aberrations are shown for the d-line, the g-line, and the C-line. In FIG. 3B, the astigmatism is shown for the sagittal image surface S and for the tangential image surface T for each wavelength. In FIG. 3C, distortion is shown for the d-line. In FIG. 3D, lateral color is shown for both the C-line and the g-line relative to the d-line. The half-field angle ω for FIGS. 3B–3D is 23.0°. As is apparent from these figures, the various aberrations are favorably corrected.

Embodiment 3

Embodiment 3 is very similar to Embodiment 1 and uses the same number of lens elements. Because Embodiment 3 is very similar to Embodiment 1, the differences between Embodiment 3 and Embodiment 1 will be evident from Table 3 that follows.

Figure 4A:
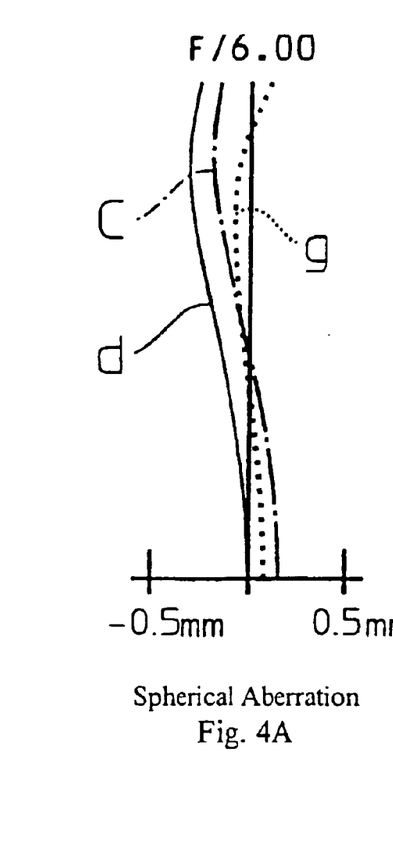
FIGS. 4A–4D show the spherical aberration, astigmatism, distortion, and lateral color, respectively, of the image scanning lens according to Embodiment 3.
Figure 4B:
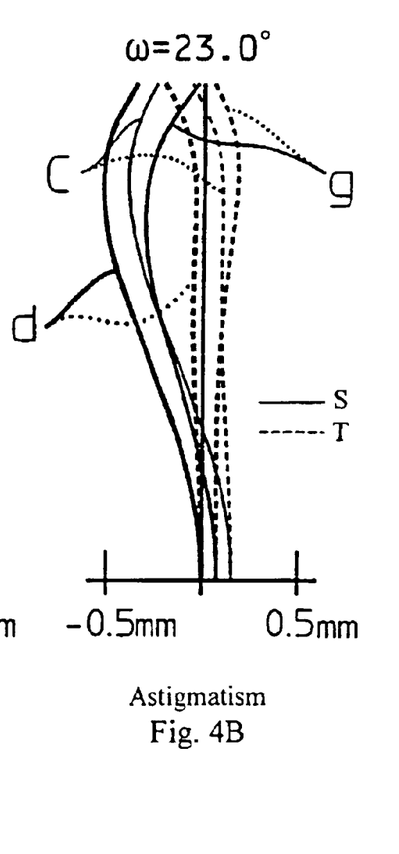
Figure 4C:
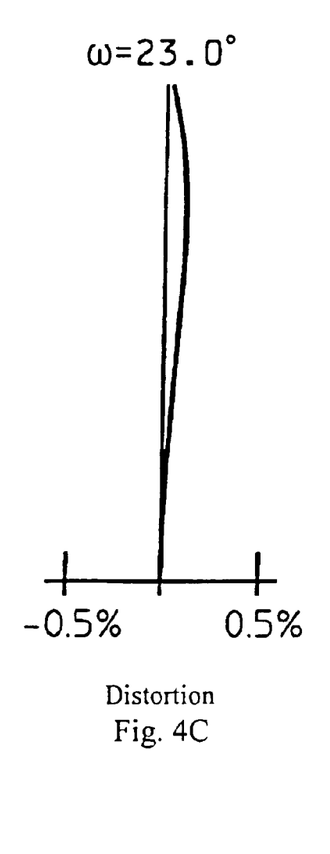
Figure 4D:
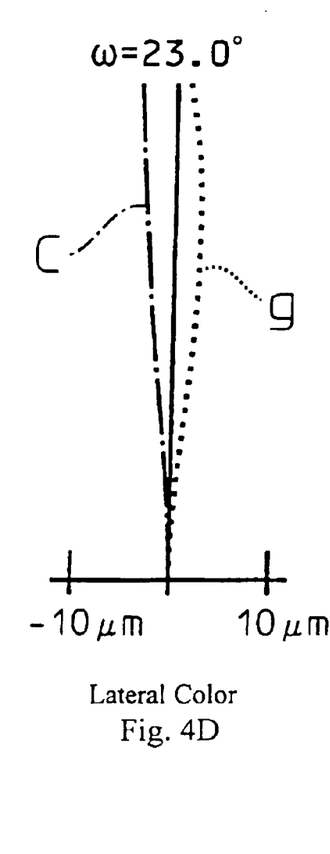

Table 3 below lists the surface number # in order from the object side, the radius of curvature R (in mm) of each surface, the on-axis surface spacing D (in mm), the refractive index $N_d$ (at the d-line), the refractive index $N_g$ (at the g-line), the refractive index $N_F$ (at the F-line), the refractive index $N_C$ (at the C-line), the Abbe number $v_d$ (at the d-line), and the product name that the manufacturer (O'Hara) uses to identify the optical material used to make each lens element for Embodiment 3. Listed in the middle portion of Table 3 are the focal length f, the f-number $F_{NO}$, the magnification β, and the maximum field angle 2ω for Embodiment 3. Furthermore, listed in the bottom portion of Table 3 are the values corresponding to Conditions (1)–(8) for Embodiment 3.

well as a plane parallel plate with a thickness of 1.77 mm being arranged in the optical path on the image side of the image scanning lens. As shown in FIG. 4A, the spherical aberration is shown at an f-number, $F_{NO}$, of 6.00. In FIGS. 4A and 4B, aberrations are shown for the d-line, the g-line, and the C-line. In FIG. 4B, the astigmatism is shown for the sagittal image surface S and for the tangential image surface T for each wavelength. In FIG. 4C, distortion is shown for the d-line. In FIG. 4D, lateral color is shown for both the C-line and the g-line relative to the d-line. The half-field angle ω for FIGS. 4B–4D is 23.0°. As is apparent from these figures, the various aberrations are favorably corrected.

Embodiment 4

Embodiment 4 is very similar to Embodiment 1 and uses the same number of lens elements. However, in Embodiment 4, the fourth lens element $L_4$ is a biconcave lens element rather than a meniscus lens element as in Embodiments 1–3. Because Embodiment 4 is very similar to Embodiment 1, the differences between Embodiment 4 and Embodiment 1 will be evident from Table 4 that follows.

Table 4 below lists the surface number # in order from the object side, the radius of curvature R (in mm) of each surface, the on-axis surface spacing D (in mm), the refractive index $N_d$ (at the d-line), the refractive index $N_g$ (at the g-line), the refractive index $N_F$ (at the F-line), the refractive

TABLE 3

| # | R | D | $N_d$ | $N_g$ | $N_F$ | $N_C$ | $v_d$ | Lens Material |
|---|---|---|---|---|---|---|---|---|
| 1 | 28.30 | 11.95 | 1.61800 | 1.63010 | 1.62479 | 1.61504 | 63.4 | S-PHM52 |
| 2 | 49.47 | 2.03 | | | | | | |
| 3 | −107.37 | 4.95 | 1.66680 | 1.69311 | 1.68110 | 1.66092 | 33.0 | S-TIM39 |
| 4 | 31.35 | 1.65 | | | | | | |
| 5 | ∞(stop) | 0.00 | | | | | | |
| 6 | 47.5 | 15.22 | 1.83481 | 1.85955 | 1.84852 | 1.82898 | 42.7 | S-LAH55 |
| 7 | −27.59 | 0.49 | | | | | | |
| 8 | −24.65 | 2.28 | 1.65412 | 1.67517 | 1.66571 | 1.64923 | 39.7 | S-NBH5 |
| 9 | −162.07 | | | | | | | | f = 100 mm   $F_{NO}$ = 6.0   β = −0.189   2ω = 46.1°
Condition (1) value: $θ_{gd}$ = 1.24103 ($v_d$ = 63.4)
Condition (2) value: $θ_{gd}$ = 1.27731 ($v_d$ = 39.7)
Condition (3), (3'), (6) value: f1/f = 0.880
Condition (4), (4'), (7) value: | f2 |/f = 0.359
Condition (5), (5'), (8) value: | f4 |/f = 0.447

In Table 3 above, Condition (2) relates to the fourth lens element $L_4$. Embodiment 3 satisfies Conditions (1)–(5).

FIGS. 4A–4D show the spherical aberration, astigmatism, distortion, and lateral color, respectively, of the image scanning lens of Embodiment 3. These aberration diagrams are based on the focal length being 100 mm and a plane parallel glass plate with a thickness of 7.10 mm being arranged in the optical path on the object side of the image scanning lens as index $N_C$ (at the C-line), the Abbe number $v_d$ (at the d-line), and the product name that the manufacturer (O'Hara) uses to identify the optical material used to make each lens element for Embodiment 4. Listed in the middle portion of Table 4 are the focal length f, the f-number $F_{NO}$, the magnification β, and the maximum field angle 2ω for Embodiment 4. Furthermore, listed in the bottom portion of Table 4 are the values corresponding to Conditions (1)–(8) for Embodiment 4.

TABLE 4

| # | R | D | $N_d$ | $N_g$ | $N_F$ | $N_C$ | $v_d$ | Lens Material |
|---|---|---|---|---|---|---|---|---|
| 1 | 26.90 | 8.24 | 1.61800 | 1.63010 | 1.62479 | 1.61504 | 63.4 | S-PHM52 |
| 2 | 105.29 | 1.47 | | | | | | |
| 3 | −186.51 | 3.78 | 1.65412 | 1.67517 | 1.66571 | 1.64923 | 39.7 | S-NBH5 |
| 4 | 29.37 | 5.34 | | | | | | |
| 5 | ∞(stop) | 0.00 | | | | | | |
| 6 | 73.67 | 14.69 | 1.81600 | 1.83800 | 1.82825 | 1.81075 | 46.6 | S-LAH59 |
| 7 | −25.64 | 0.46 | | | | | | |

TABLE 4-continued

| # | R | D | $N_d$ | $N_g$ | $N_F$ | $N_C$ | $v_d$ | Lens Material |
|---|---|---|---|---|---|---|---|---|
| 8 | −22.68 | 3.80 | 1.58144 | 1.59973 | 1.59149 | 1.57722 | 40.7 | S-TIL25 |
| 9 | 411.67 | | | | | | | | f = 100 mm  $F_{NO}$ = 6.0  β = −0.189  2ω = 46.0°
Condition (1) value: $\theta_{gd}$ = 1.24103 ($v_d$ = 63.4)
Condition (2) value: $\theta_{gd}$ = 1.27731 ($v_d$ = 39.7)
Condition (3), (3'), (6) value: f1/f = 0.562
Condition (4), (4'), (7) value: |f2|/f = 0.385
Condition (5), (5'), (8) value: |f4|/f = 0.369

In Table 4 above, Condition (2) relates to the second lens element $L_2$. Embodiment 4 satisfies Conditions (1)–(5). Additionally, Embodiment 4 satisfied Conditions (6)–(8).

Figure 5A:
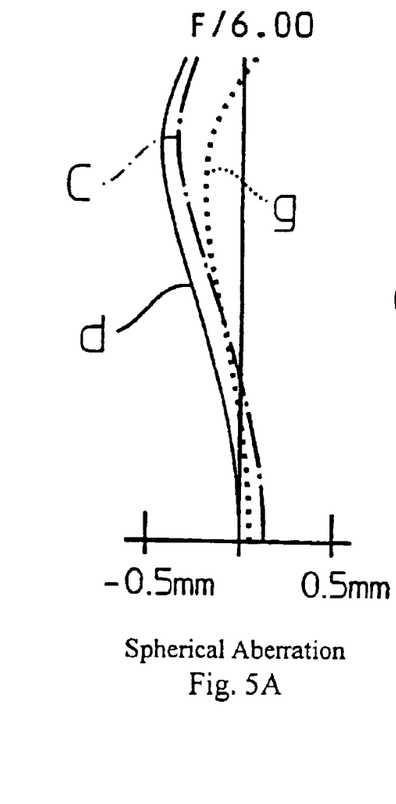
FIGS. 5A–5D show the spherical aberration, astigmatism, distortion, and lateral color, respectively, of the image scanning lens according to Embodiment 4.
Figure 5B:
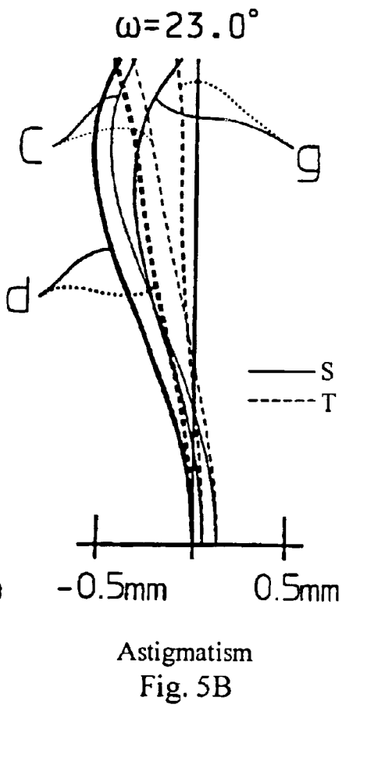
Figure 5C:
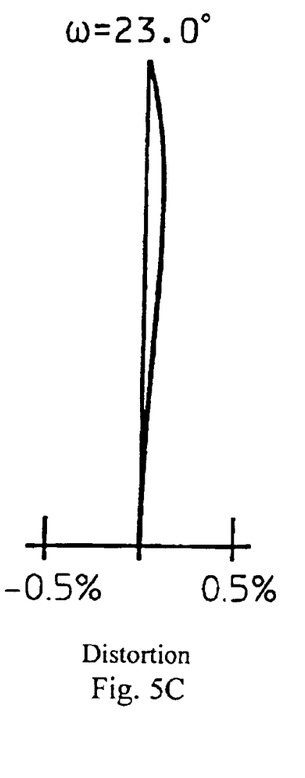
Figure 5D:
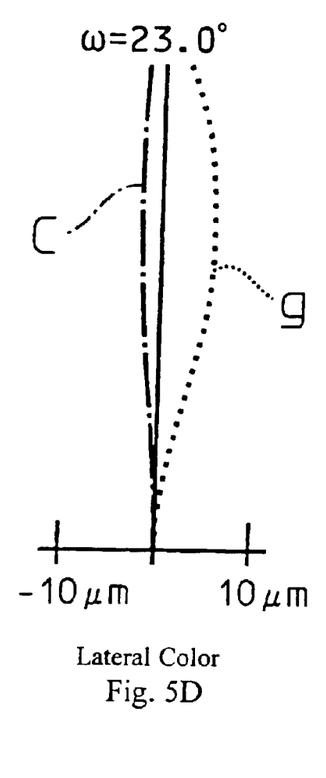

FIGS. 5A–5D show the spherical aberration, astigmatism, distortion, and lateral color, respectively, of the image scanning lens of Embodiment 4. These aberration diagrams are based on the focal length being 100 mm and a plane parallel glass plate with a thickness of 7.10 mm being arranged in the optical path on the object side of the image scanning lens as well as a plane parallel plate with a thickness of 1.77 mm being arranged in the optical path on the image side of the image scanning lens. As shown in FIG. 5A, the spherical aberration is shown at an f-number, $F_{NO}$, of 6.00. In FIGS. 5A and 5B, aberrations are shown for the d-line, the g-line, and the C-line. In FIG. 5B, the astigmatism is shown for the sagittal image surface S and for the tangential image surface T for each wavelength. In FIG. 5C, distortion is shown for the d-line. In FIG. 5D, lateral color is shown for both the C-line and the g-line relative to the d-line. The half-field angle ω for FIGS. 5B–5D is 23.0°. As is apparent from these figures, the various aberrations are favorably corrected.

Figure 6:
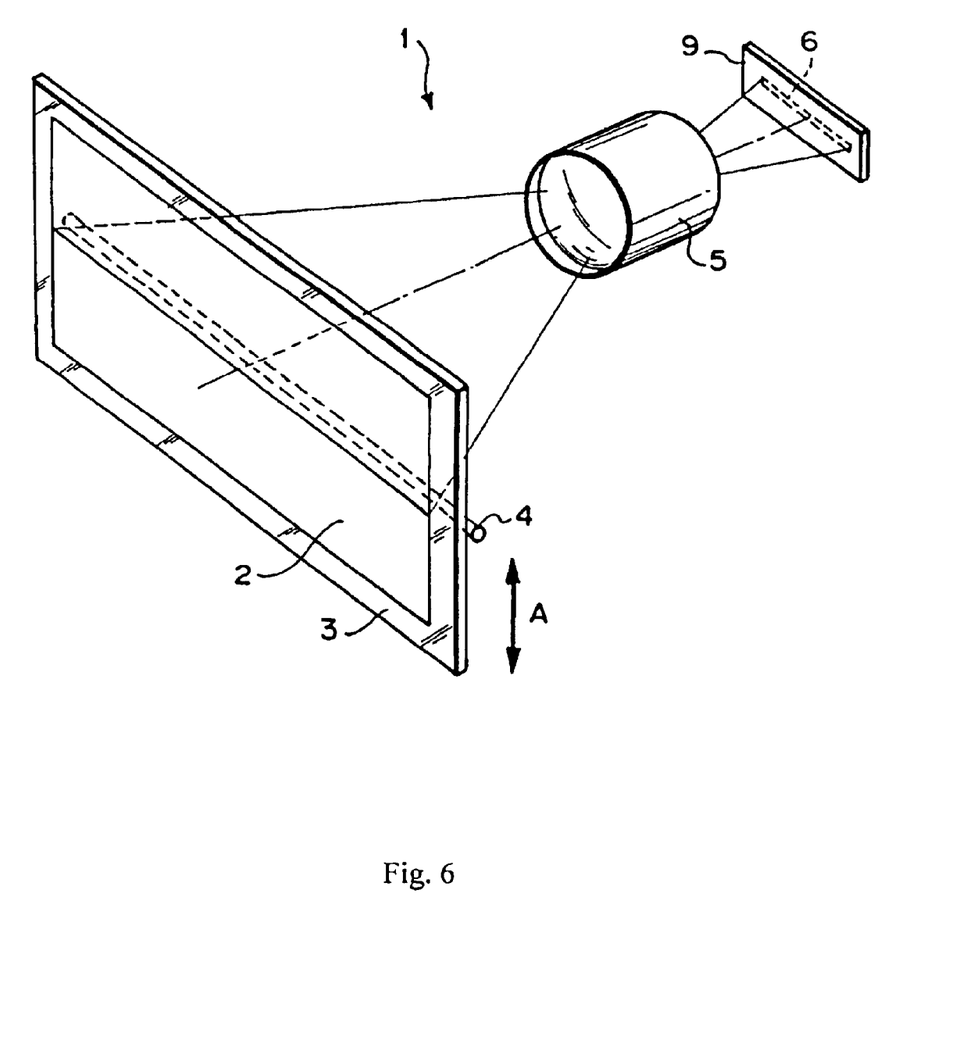
FIG. 6 shows a schematic perspective view of an image scanning device that uses an image scanning lens of the present invention.

FIG. 6 shows a schematic perspective view of an image scanning device 1, such as a facsimile machine or an image scanner, that uses an image scanning lens 5 of the present invention. The image scanning device 1 includes the image scanning lens 5 between a glass plate 3 on which an original document 2 is placed and a cover glass 9 that covers an image pickup device, such as a linear CCD 6 with CCD elements arranged in a linear pattern. Additionally, as shown in FIG. 6, an illuminating device 4 is arranged between the glass plate 3 and the image scanning lens 5. The image on the original document 2 is scanned by shifting the original document 2 in the direction of the double-headed arrow A. The linear CCD 6 scans the line optically conjugate to it on the original document that intersects the optical axis of the image scanning lens 5. Thus, light reflected from the original document is focused by the image scanning lens to form a line image on the linear CCD 6 of an optically conjugate line on the original document.

The present invention is not limited to the aforementioned embodiments, as it will be obvious that various alternative implementations are possible. For instance, values such as the radius of curvature R of each of the lens elements, the surface spacings D, the refractive indexes $N_d$, $N_g$, $N_F$, and $N_C$, as well as the Abbe number $v_d$, are not limited to the examples indicated in each of the aforementioned embodiments, as other values can be adopted. Additionally, the image scanning lens of the present invention may be used in various image scanning devices. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An image scanning lens comprising, in order from the object side with no intervening lens element:
   a first lens component having positive refractive power and a meniscus shape with its convex surface on the object side and including a first lens element having positive refractive power and a meniscus shape with its convex surface on the object side;
   a second lens component having a biconcave shape and including a second lens element having a biconcave shape;
   a third lens component having a biconvex shape and including a third lens element having a biconvex shape;
   a fourth lens component having negative refractive power and a concave surface on the object side and including a fourth lens element having negative refractive power and a concave surface on the object side;
   wherein the following conditions are satisfied:
   $\theta_{gd} > -2.083 \cdot 10^{-3} \cdot v_d + 1.366$ for said first lens element,
   $\theta_{gd} < -2.083 \cdot 10^{-3} \cdot v_d + 1.364$ for at least one of said second lens element and said fourth lens element,
   where
   $v_d$ is the Abbe number at the d-line (587.56 nm) of the lens material of the lens element being considered, and
   $\theta_{gd} = (N_g - N_d)/(N_F - N_C)$
   where
   $N_g$ is the refractive index at the g-line (λ=435.83 nm) of the lens material of the lens element being considered,
   $N_d$ is the refractive index at the d-line (λ=587.56 nm) of the lens material of the lens element being considered,
   $N_F$ is the refractive index at the F-line (λ=486.13 nm) of the lens material of the lens element being considered, and
   $N_C$ is the refractive index at the C-line (λ=656.27 nm) of the lens material of the lens element being considered.

2. The image scanning lens of claim 1, wherein each of said first lens component, said second lens component, said third lens component, and said fourth lens component is formed of a single lens element.

3. The image scanning lens of claim 2, wherein said fourth lens element is a biconcave lens element and the second lens element is made of a material that satisfies the condition $\theta_{gd} < -2.083 \cdot 10^{-3} \cdot v_d + 1.364$.

4. The image scanning lens of claim 3, wherein the following conditions are satisfied:

$0.45 < f1/f < 0.66$ $0.36 < |f2|/f < 0.40$ $0.31 < |f4|/f < 0.52$ where
- f1 is the focal length of said first lens component,
- f2 is the focal length of said second lens component,
- f4 is the focal length of said fourth lens component, and
- f is the focal length of the image scanning lens.

5. The image scanning lens of claim 2, wherein the following conditions are satisfied:

$$0.45 < f1/f < 0.98$$

$$0.34 < |f2|/f < 0.40$$

$$0.31 < |f4|/f < 0.56$$

where
- f1 is the focal length of said first lens component,
- f2 is the focal length of said second lens component,
- f4 is the focal length of said fourth lens component, and
- f is the focal length of the image scanning lens.

6. The image scanning lens of claim 2, in combination with an image scanning device that includes an image pickup device for receiving an image formed by the image scanning lens.

7. The image scanning lens of claim 1, wherein the image scanning lens is formed of only four lens components.

8. The image scanning lens of claim 7, wherein each of said first lens component, said second lens component, said third lens component, and said fourth lens component is formed of a single lens element.

9. The image scanning lens of claim 8, wherein said fourth lens element is a biconcave lens element and the second lens element is made of a material that satisfies the condition $\theta_{gd} < -2.083 \cdot 10^{-3} \cdot v_d + 1.364$.

10. The image scanning lens of claim 9, wherein the following conditions are satisfied:

$$0.45 < f1/f < 0.66$$

$$0.36 < |f2|/f < 0.40$$

$$0.31 < |f4|/f < 0.52$$

where
- f1 is the focal length of said first lens component,
- f2 is the focal length of said second lens component,
- f4 is the focal length of said fourth lens component, and
- f is the focal length of the image scanning lens.

11. The image scanning lens of claim 8, wherein the following conditions are satisfied:

$$0.45 < f1/f < 0.98$$

$$0.34 < |f2|/f < 0.40$$

$$0.31 < |f4|/f < 0.56$$

where
- f1 is the focal length of said first lens component,
- f2 is the focal length of said second lens component,
- f4 is the focal length of said fourth lens component, and
- f is the focal length of the image scanning lens.

12. The image scanning lens of claim 8, in combination with an image scanning device that includes an image pickup device for receiving an image formed by the image scanning lens.

13. The image scanning lens of claim 7, wherein said fourth lens element is a biconcave lens element and the second lens element is made of a material that satisfies the condition $\theta_{gd} < -2.083 \cdot 10^{-3} \cdot v_d + 1.364$.

14. The image scanning lens of claim 13, wherein the following conditions are satisfied:

$$0.45 < f1/f < 0.66$$

$$0.36 < |f2|/f < 0.40$$

$$0.31 < |f4|/f < 0.52$$

where
- f1 is the focal length of said first lens component,
- f2 is the focal length of said second lens component,
- f4 is the focal length of said fourth lens component, and
- f is the focal length of the image scanning lens.

15. The image scanning lens of claim 7, wherein the following conditions are satisfied:

$$0.45 < f1/f < 0.98$$

$$0.34 < |f2|/f < 0.40$$

$$0.31 < |f4|/f < 0.56$$

where
- f1 is the focal length of said first lens component,
- f2 is the focal length of said second lens component,
- f4 is the focal length of said fourth lens component, and
- f is the focal length of the image scanning lens.

16. The image scanning lens of claim 7, in combination with an image scanning device that includes an image pickup device for receiving an image formed by the image scanning lens.

17. The image scanning lens of claim 1, wherein said fourth lens element is a biconcave lens element and the second lens element is made of a material that satisfies the condition $\theta_{gd} < -2.083 \cdot 10^{-3} \cdot v_d + 1.364$.

18. The image scanning lens of claim 12, wherein the following conditions are satisfied:

$$0.45 < f1/f < 0.66$$

$$0.36 < |f2|/f < 0.40$$

$$0.31 < |f4|/f < 0.52$$

where
- f1 is the focal length of said first lens component,
- f2 is the focal length of said second lens component,
- f4 is the focal length of said fourth lens component, and
- f is the focal length of the image scanning lens.

19. The image scanning lens of claim 1, wherein the following conditions are satisfied:

$$0.45 < f1/f < 0.98$$

$$0.34 < |f2|/f < 0.40$$

$$0.31 < |f4|/f < 0.56$$

where
- f1 is the focal length of said first lens component,
- f2 is the focal length of said second lens component,
- f4 is the focal length of said fourth lens component, and
- f is the focal length of the image scanning lens.

20. The image scanning lens of claim 1, in combination with an image scanning device that includes an image pickup device for receiving an image formed by the image scanning lens.

* * * * *